(12) United States Patent
Heyl et al.

(10) Patent No.: US 12,174,695 B2
(45) Date of Patent: Dec. 24, 2024

(54) METHOD FOR PROVIDING A FUNCTION VIA A NETWORK OF PROCESSING UNITS

(71) Applicant: Robert Bosch GmbH, Stuttgart (DE)

(72) Inventors: Andreas Heyl, Weil der Stadt (DE); Christian Zimmermann, Stuttgart (DE); Markus Schweizer, Vaihingen/Enz (DE); Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 99 days.

(21) Appl. No.: 18/047,340

(22) Filed: Oct. 18, 2022

(65) Prior Publication Data

US 2023/0127778 A1 Apr. 27, 2023

(30) Foreign Application Priority Data

Oct. 21, 2021 (DE) ...................... 10 2021 211 906.9

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
CPC .............. G06F 11/079; G06F 11/0709; G06F 11/1629; G06F 11/1641; G06F 11/165; G06F 11/1654; G06F 11/183; G06F 11/187; G06F 11/188; G06F 11/2028; G06F 11/3024; G06F 11/3006
See application file for complete search history.

(56) References Cited

U.S. PATENT DOCUMENTS

| | | | | |
|---|---|---|---|---|
| 5,761,412 | A * | 6/1998 | Higgins | .................... G06F 9/50 709/224 |
| 7,877,627 | B1 * | 1/2011 | Freydel | ............... G06F 11/1633 714/11 |
| 2017/0091051 | A1 * | 3/2017 | Liisberg | .............. G06F 11/1658 |
| 2020/0319981 | A1 * | 10/2020 | Rama | ..................... G06F 11/186 |
| 2021/0263779 | A1 * | 8/2021 | Haghighat | ............ G06F 11/302 |
| 2022/0012112 | A1 * | 1/2022 | Wouhaybi | ........... G06F 11/3447 |

* cited by examiner

*Primary Examiner* — Joseph D Manoskey
(74) *Attorney, Agent, or Firm* — NORTON ROSE FULBRIGHT US LLP; Gerard A. Messina (57) ABSTRACT

A method for providing a function via a network of processing units using multiple computing instances. Each computing instance implements the function and is configured, when it is executed, to determine at least one result in response to a call-up of the function. The method includes validating the computing instances, each being checked as to whether the computing instance corresponds to a respective predetermined state; determining a respective level of reliability for each of the processing units; starting execution of successfully validated computing instances in the processing units, which have a level of reliability that is equal/greater than a predetermined minimum level of reliability; receiving a function request from a user; calling up the function in at least a portion of the executed computing instances corresponding to the function request, in order to determine multiple results; determining a response based on the results; and sending the response to the user.

13 Claims, 3 Drawing Sheets

METHOD FOR PROVIDING A FUNCTION VIA A NETWORK OF PROCESSING UNITS

CROSS REFERENCE

The present application claims the benefit under 35 U.S.C. § 119 of German Patent Application No. DE 10 2021 211 906.9 filed on Oct. 21, 2021, which is expressly incorporated herein by reference in its entirety.

FIELD

The present invention relates to a method for providing a function via a network of processing units and to a provisioning processing unit and to a provisioning computer program for carrying out the method.

BACKGROUND INFORMATION

Computing resources may be provided decentrally by computer systems. Examples of this are so-called "Cloud Computing" (computing resources reachable via a communication network, for example, the Internet) or so-called "Edge Computing" (computing resources provided at the edge of a communication network). Modern networks, for example, so-called 5G mobile communications networks, may have high bandwidths coupled with low latencies. This makes it possible to shift complex and computationally-intensive algorithms, which relate to the functionality or to the operation of machines, in particular, also of vehicles, into decentrally provided computing resources, in order to relieve control units of the machines or to implement functions that are not performable by control units of the machines.

SUMMARY

According to the present invention, a method for providing a function via a network of processing units as well as a provisioning processing unit and a provisioning computer program for carrying out the method are provided. Advantageous example embodiments of the present invention are disclosed herein.

According to an example embodiment, in response to a function request received from a user, the present invention takes the step of calling up the function in at least a portion of multiple computing instances in order to determine multiple results, on the basis of which a response is determined, which is sent to the user. The computing instances are validated and executed only in processing units of a network of processing units (computer network), which have a predetermined minimum level of reliability. On the one hand, a redundancy in the determination of the response is ensured in this way and, on the other hand, the integrity or reliability of the processing units and thus of the computing instances executed therein is ensured. As a result, a high probability that the response to the function request is correct is able to be achieved.

The computing instances are preferably computer programs, but may, in principle also be implemented entirely or partially in hardware, for example, as an ASIC (application-specific integrated circuit) or as an FPGA (field-programmable gate array) or the like. Combinations of computer programs with hardware are also possible. The computing instances may, for example, be provided in the form of so-called containers. Each computing instance implements the function with the aid of at least one algorithm and is configured, when it is executed, to determine at least one result in response to a call-up of the function. The computing instances are configured to be executed in processing units of the network of processing units. Each processing unit (for example, a computer or a computer system) includes one or multiple processors including in each case at least one processor core, in which the computing instances (in particular, computer programs) are executed. Each processing unit further includes a volatile and/or a non-volatile memory, in which computing instances implemented, in particular, as computer programs, may be stored. Each processing unit may be configured to execute multiple computing instances simultaneously or in parallel. Each processing unit may be considered to be a particular hardware (for example, particular processors, particular memories, etc.) (which may be different for different processing units), which represents a uniform environment for the execution of computing instances. Each processing unit may be accordingly assigned a level of reliability.

The computing instances are validated by checking for each computing instance whether the computing instance corresponds to a respective predetermined state. To ensure that the function is called up only in computing instances that are executed in reliable processing units, a level of reliability is determined for each of the processing units and the execution of successfully validated computing instances is started only in processing units which have a level of reliability that is equal to or greater than a predetermined minimum level of reliability.

The user is, in particular, itself a processing unit or includes one, in both cases for distinguishing between processing units of the computer network, also referred to as a user-dedicated processing unit, for example, a control unit of a vehicle or of another machine, a computer, in particular, a mobile computer, or a processing unit included in a mobile device (for example, a smartphone). The user, i.e., the user-dedicated processing unit or software executed in the processing unit, may request the function provided in the network of processing units. In general, multiple users may request the function independently of one another. The function request or request for the function places a request to provide a response to a corresponding function call-up, call-up parameters, in particular, being able to be included in the function request.

The steps of the method may be carried out or prompted in a computer-implemented manner by a provisioning element, in particular, a provisioning processing unit or a provisioning computer program executed in a processing unit.

According to an example embodiment of the present invention, the results are preferably compared with one another in order to determine the response, one of the results being used as a response, which most frequently matches other results within predefined tolerances. The result is further preferably used as a response, which matches at least a predefined minimum number of results within predefined tolerances. This approach may be considered to be a type of alignment method. For results differing from one another (taking tolerances into account), in particular, a number of results may be determined in each case, and that result of the results differing from one another may be used as a response, which has the highest number of results, the number of results preferably having to be greater than the predefined minimum number of results. When determining the number of results, weights of the results may also be taken into account, i.e., each result is incorporated in the count according to the weight of the result with which the number of results is obtained. The number of results is thus not necessarily an integral number, but may be an arbitrary real number (greater than zero), depending on which values the weights have. When comparing, tolerances are taken into account, since small differences in the results of different algorithms may result, in particular, in continuous numerical results, without the results being substantially different, i.e., these are to be assessed as identical in terms of the function. Such tolerances may be specified as a maximum relative or absolute deviation and may be determined by those skilled in the art who implement the function with the aid of algorithms. Such tolerances may also be zero.

According to an example embodiment of the present invention, a response confidence is preferably determined based on the frequency with which the response appears in the results taking the tolerances into account, and is sent to the user. Each result is preferably assigned a confidence value, the confidence values being taken into account in the determination of the response. The confidence value may occur, for example, based on a confidence or a trust in the computing instance, in the respective algorithm and/or in the processing unit (in particular, based on the level of reliability of the processing unit), with which the respective result has been determined. It may additionally or alternatively also be provided that the algorithms determine a confidence for the result and return it together with the result, this confidence then being taken into account in the determination of the confidence value. Confidence values may, for example, be integers or real numbers greater than or equal to zero, the trust in the result being that much greater the higher the confidence value is. The confidence values could, in particular, be real numbers in the interval of 0 (zero) to K, K being a real number greater than 0. In this case, a wide variety of assignments are, of course, possible.

In the determination of the response, preferably only results that have at least a minimum confidence value are taken into account, and/or the results are weighted in accordance with the confidence values. When weighting, for example, the confidence values, if they are integers or real numbers greater than or equal to zero, may themselves be used as weights. The confidence values could also be mapped by another mapping onto the weights, in particular, a mapping, which is monotonically increasing, preferably strictly monotonically increasing. If, as described above, the results are compared with one another and the response is determined according to the number (number of results) with which a result occurs, the results may be counted in this determination of the number of results in accordance with their respective weights.

An overall confidence value is preferably determined based on the confidence values of the results and the overall confidence value is sent to the user (for example, together with the response). In the determination of the overall confidence value, the response confidence may further preferably also be taken into account. The overall confidence value may be considered to be a statement about the accuracy of the response.

An actual level of reliability or an average level of reliability of the processing units, in which the computing instances are executed, in which the function has been called up, is sent to the user. The actual level of reliability (i.e., the level of reliability of each of the processing units, in which the computing instances are executed, in which the function has been called up) or the average level of reliability, may be sent together with the response. This enables the user to decide whether or to what degree he/she trusts the response.

According to an example embodiment of the present invention, the method preferably includes an execution of test call-ups, for which a reference result is known, of the function and/or of a test function in order to determine test results, and a comparison of the test results with the reference results in order, based on the test results that do not match the reference results, to recognize faulty processing units and/or faulty computing instances. Reference results are known to represent correct results and are determined, for example, by a faultless processing unit and computing instance. The reference result may also be known per se to those skilled in the art, who implement the function or the test function. Test call-ups may call up the function that is provided by the former for users, or may call up a different test function, which is configured or programmed in such a way that particular elements (processor, memory) of the processing unit are checked. Since it is generally not possible in the case of a single error to establish whether this error is caused by the computing instance or by the processing unit in which the latter is executed, a plurality of test call-ups in this case may be carried out, which relate on the one hand to different computing instances that are executed by the same processing unit and, on the other hand, to identical computing instances that are executed by different processing units, in order to be able to assign errors to a particular computing instance or processing unit. In the case of test functions, which check specific elements (processor, memory) of the processing units, this information may, if necessary also be evaluated in order to be able to assign errors.

The level of reliability of a processing unit, which has been recognized as faulty, is preferably reduced, further preferably reduced below the minimum level of reliability. Alternatively or in addition, results of a computing instance that has been recognized as faulty are assigned a reduced confidence value. Alternatively or in addition, the execution of computing instances that have been recognized as faulty or that are executed in processing units recognized as faulty, is stopped. In this way, the probability that incorrect or inaccurate responses are returned to users may be reduced.

Multiple different algorithms, which implement the function, are preferably provided in a single one of the computing instances in order to determine multiple computing instance results. In this way, a certain redundancy may be achieved, errors occurring in a single algorithm, for example, due to a program error, being recognized or compensated for, i.e., not resulting in an erroneous response. The different algorithms may be reachable or callable, for example, via different "ports" of the computing instance.

According to an example embodiment of the present invention, an overall result of the computing instance is preferably determined based on the multiple computing instance results and the response is determined based on the overall result of the computing instance. The overall result used may be the computing instance result that occurs most frequently, i.e., matches most frequently other computing instance results (within predefined tolerances). It may again also be provided that the overall result must occur at least a particular number of times. If no overall result is able to be found, for example, if all computing instance results differ, an overall result in the form of a corresponding error message may be returned. The computing instance results may be weighted in the determination of the overall result of the computing instance (for example, the computing instance of an empirically very reliable algorithm may be weighted more heavily). If necessary, a confidence value of the overall result of the computing instance may be determined based on how often the overall result occurs in the computing instance results. Alternatively, every computing instance result may be incorporated as a result in the determination of the response. Mixed forms are also possible, i.e., based on several of the computing instance results, an overall result is determined, which is incorporated in the determination of the response, and the several (other) computing instance results are incorporated directly in the determination of the response.

According to an example embodiment of the present invention, multiple identical computing instances in different processing units are preferably started and/or the function is called up in multiple identical computing instances. As a result, a single malfunctioning processing unit may be precluded from (too strongly) negatively influencing the response, i.e., resulting in an overall erroneous response. The term "identical computing instances" is intended to refer to computing instances in which the function is implemented by the same algorithms. These computing instances may, in particular, be so-called containers (software), which are based on the same image.

When determining the response, preferably only results are taken into account that fall within a predefined maximum response time, predefined, in particular, in the function request. This is advantageous for time-critical functions.

A provisioning processing unit according to an example embodiment of the present invention is configured, in particular programmed, to carry out a method according to the present invention. The provisioning processing unit may, for example, be a control unit or may be included in a control unit of a motor vehicle (the user may then be another control unit or another computer program executed in the same control unit). The provisioning processing unit may equally also be a processing unit of the network of processing units, in which a provisioning instance, i.e., a provisioning computer program, which is configured to carry out a method according to the present invention, is executed. This may also be the case for multiple processing units of the network of processing units. At least one separate provisioning processing unit may also be provided in, or may be in data communication connection with, the network of processing units. In either case, multiple provisioning processing units may be present. Combinations of the aforementioned examples are equally possible.

The implementation of a method according to the present invention in the form of a computer program or provisioning computer program or computer program product including program code for carrying out all method steps is also advantageous, since this generates particularly low costs, in particular, if an executing control unit is also used for further tasks and is therefore already present. Finally, a machine-readable memory medium is provided including a computer program stored thereon as described above. Suitable memory media or data carriers for providing the computer program are, in particular, magnetic, optical and electrical memories such as, for example, hard disks, flash memories, EEPROMs, DVDs and the like. A download of a program via computer networks (Internet, Intranet, etc.) is also possible. Such a download in this case may take place in a hardwired or cable-bound or wireless manner (for example, via a WLAN network, a 3G-, 4G-, 5G- or 6G-connection, etc.).

Further advantages and embodiments of the present invention result from the description and from the figures.

The present invention is schematically represented in the figures based on exemplary embodiments and is described below with reference to the figures.

DETAILED DESCRIPTION OF EXAMPLE EMBODIMENTS

Figure 1:
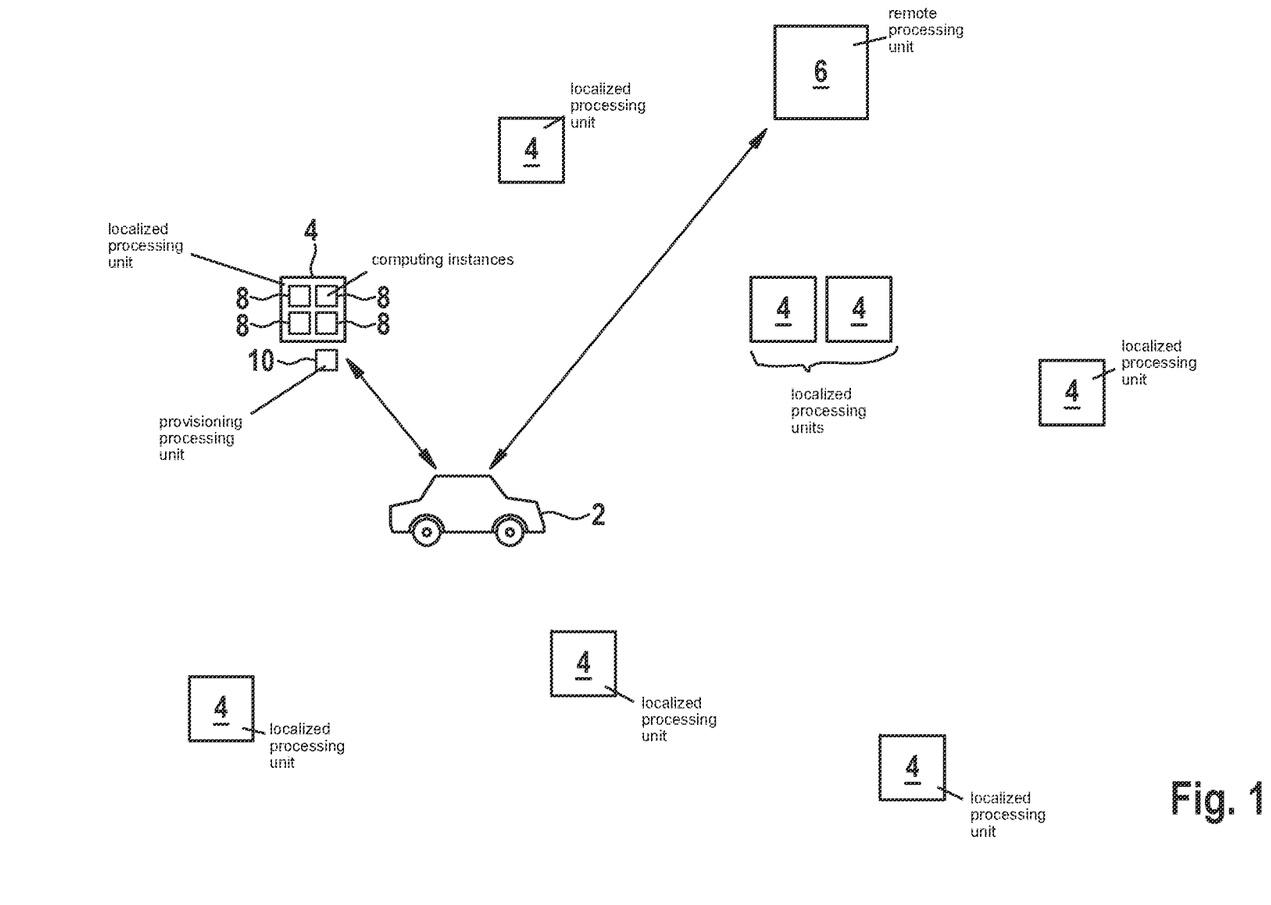
FIG. 1 shows an exemplary network of processing units and a user, according to the present invention.

FIG. 1 shows by way of example a network of processing units 4, 6, in which computing instances 8 are executed, and a user 2. The network of processing units provides functions or services for a plurality of users, for example, for user 2 shown. Multiple (geographically) localized processing units 4, for example, so-called edge servers, and a remote processing unit 6, for example, a so-called cloud server, are shown.

Localized processing units 4 are advantageously situated in a spatially distributed manner, so that users, which request a provided function, are most likely located close to at least one localized processing unit 4, so that a low latency or short signal propagation times are able to be achieved during the data communication, as a result of which it is possible to shift time-critical functions from a user-dedicated processing unit to the network of processing units. Localized processing units 4 are thus processing units separated (remote) from the user, to each of which a location may be assigned, i.e., they are localized from the point of view of the user. Localized processing units 4 are situated preferably at the edge of a communication network, which communicates directly with the users. The communication network is typically a mobile communications network, for example, a 4G- or 5G-network. Localized processing units 4 may be situated in the case of a mobile communications network close to base stations and/or close to gateways, which connect the base stations to the core network of the mobile communications network, so that a localized processing unit may be assigned to one or to multiple radio cells. Multiple different processing units may be situated at one location.

In contrast thereto, remote processing unit 6 is a processing unit (or multiple processing units), which is situated at a location undetermined per se. The data communication to the remote processing unit takes place, for example, initially via the mobile communications network, connects directly with the user, and subsequently via a further data communications network such as, for example, the Internet, which makes the data communication over long distances possible. The signal propagation times during the data communication between user 2 and remote processing unit 6 are generally significantly longer than signal propagation times between user 2 and localized processing units 4 (the latter may, for example, be several milliseconds, whereas the former may be greater by a factor of 10).

Here, user 2 is, for example, a vehicle, which has a control unit, i.e., a user-dedicated processing unit, and a mobile communication terminal connected thereto, so that the control unit is able to communicate data via a mobile communications link to processing units of the network of processing units. In this way, user 2 may, in particular, request functions or services provided by the network of processing units.

Computing instances 8 (for example, marked symbolically in one of processing units 4) are, in principle, software or computer programs and/or hardware (for example, as ASIC or FPGA) executed in the processing units, which implement at least one algorithm in each case in order to provide the function. This means, the function may be called up in each computing instance 8 (while transferring respective call-up parameters if required by this function), in order in each case to determine a result (for example, by each algorithm) which is returned to the caller or to the calling element.

The term "function" is to be understood in a general sense, i.e., as a mapping of input values or call-up parameters onto output values or results, for example, with the aid of calculations. Input values may, for example, be sensor data, state data of the user or of elements of the user, data derived from sensor data and/or state data (for example, sensor data and/or state data processed by a user-dedicated processing unit) and/or the like. It may be that a function is implemented in different ways, i.e., with the aid of different algorithms, which, in general, deliver different results, in the event the algorithms are correctly implemented and are flawlessly executed, the results deviating only slightly or not at all from one another, i.e., being the same within particular tolerances. A function could be, for example, evaluating sensor data from camera sensors and/or LIDAR sensors and/or radar sensors with the aid of image processing algorithms, in order to recognize objects in the surroundings of the user. The recognized objects or their positions may then be used as a result by the user, which is a vehicle, for example, in order to implement automatic or semi-automatic driving functions. A further example is the evaluation of sensor data and/or state data of an element of the user, for example, of an engine of an automobile, in order to check whether this element functions correctly. Functions that enable a cooperation of multiple users are also possible, for example, for automobiles, a function could evaluate camera recordings of one or of multiple of the users in order to recognize available parking spaces, which are then reported to other users, which call up the function using a parking space search request, the present position being conveyed, for example. Cooperative driving functions for automobiles, which support an automatic or semi-automatic control, are also possible.

A provisioning processing unit 10 is further represented, here, for example, close to a localized processing unit 4. Provisioning processing unit 10 is configured (for example, by executing a provisioning computer program), to carry out a method according to the present invention, i.e., from the perspective of user 2, the function request is conveyed to provisioning processing unit 10, which then calls up the function in computing instances 8 and returns or sends the response to the user. Provisioning processing unit 10 may also start or stop computing instances. If provisioning processing unit 10 is situated close to one of the (localized or remote) processing units as shown, i.e., is assigned to one or to multiple of the processing units, it may (but need not) be provided that the former uses only computing instances in the assigned processing unit or processing units. Multiple provisioning processing units may be provided (not shown). In addition to separate provisioning processing units 10, it is also possible (not shown) that at least one provisioning computer program (provisioning instance) is executed in at least one processing unit of the network of processing units, which implements a method according to the present invention. It is also possible (not shown) that a provisioning processing unit 10 is provided in the user, for example, is included in a control unit (user-dedicated processing unit), or that a provisioning computer program is executed in a control unit of the user. For the sake of simplicity, mention is made below of provisioning processing unit 10, however, the description applies equally to a provisioning computer program.

Figure 2:
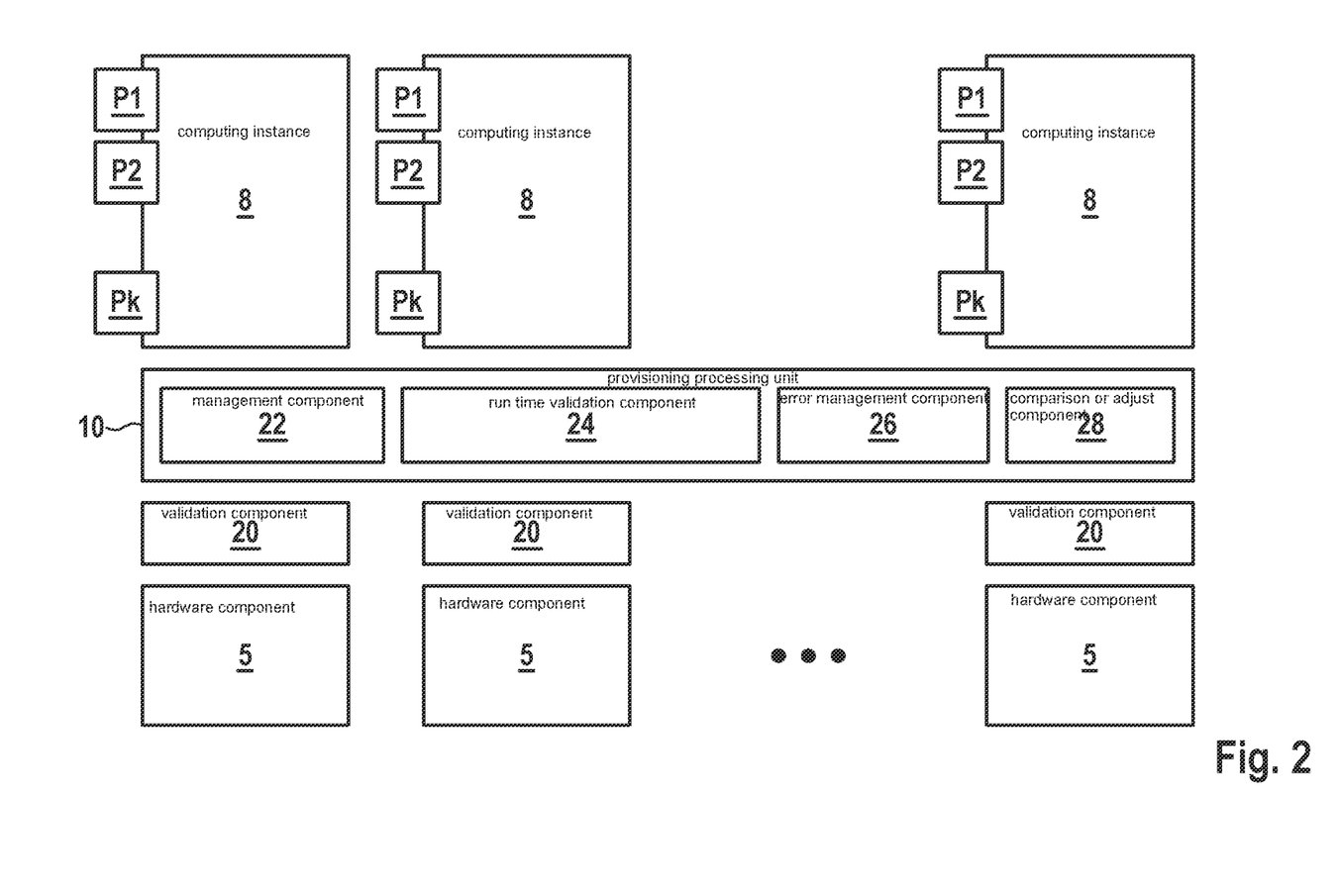
FIG. 2 schematically shows the interaction of individual elements or components of one specific example embodiment of the present invention.

FIG. 2 illustrates in symbolic form the interaction of individual elements or components of the present invention. A provisioning processing unit 10, computing instances 8 and hardware components 5 (processor, memory, etc.) of processing units of the network of processing units are shown. Provisioning processing unit 10 includes, for example, further components, which may be implemented as software, for example. FIG. 2 is explained in the following together with FIG. 3.

Figure 3:
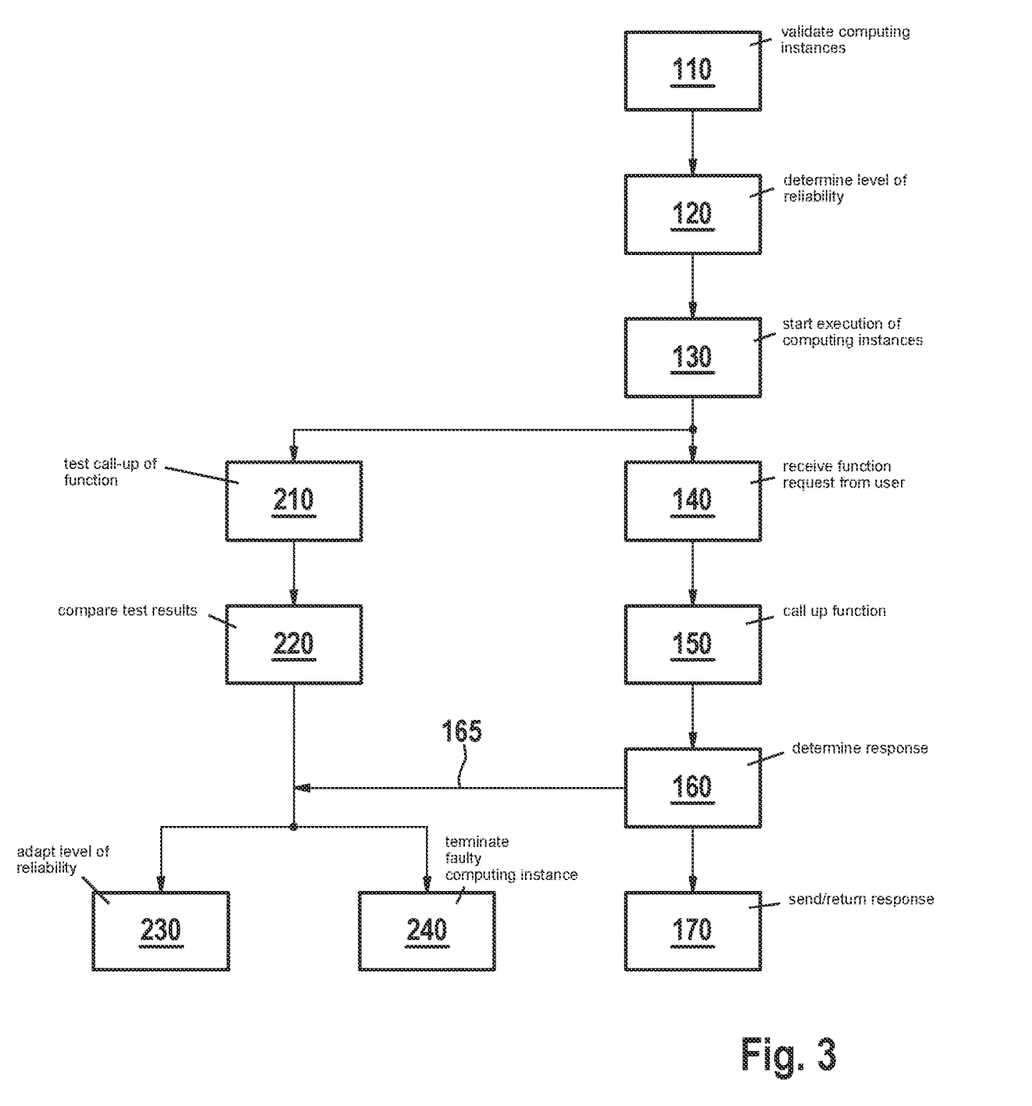
FIG. 3 shows a flowchart according to one preferred specific example embodiment of the present invention.

FIG. 3 shows a flowchart according to one preferred specific embodiment of the present invention.

In step 110, computing instances 8 are validated, the integrity of each computing instance being checked, i.e., for each computing instance, it is checked whether the computing instance corresponds to a respective predetermined state. When validating the computing instance, which may be considered to be a computer program (and/or as hardware), a hash value and/or a check sum of the stored computing instance may be formed and compared with a reference hash value or a reference check sum, which has been determined while the computing instance was situated in the predetermined state (i.e., was situated in an unaltered or non-manipulated state), in order, upon equality, to confirm the integrity, i.e., to successfully validate the computing instance. Computing instances may, for example, be provided by a so-called image, i.e., in principle a memory image, at least one copy of the image being stored in a processing unit and executed there (as a so-called container), i.e., the execution of the computing instance in the processing unit may be started. In this case, a hash value or a check sum of the image and/or a hash value or a check sum may be formed and compared with corresponding reference hash values or reference check sums.

Furthermore, digital certificates may additionally or alternatively be used in order to be able to recognize intentional manipulations. For the validation of computing instances, validation components 20 (or validation interfaces) may be provided in order to validate the computing instances in the processing units. For example, hash values could be calculated for memory areas of the computing instances (hardware components 5) in which the computing instances are stored.

In step 120, which may also take place at least partially before and/or at least partially in parallel to step 110, a respective level of reliability is determined for each of the processing units. The level of reliability of a processing unit indicates to what extent results of computing instances carried out in the processing unit are trustworthy, correct and/or error-free, or may be viewed as such. The determination of the level of reliability may be based on different aspects. Thus, the hardware of the processing unit and optionally its age may be taken into account, for example, processor type, memory type (a processing unit including ECC memory would have, for example, a higher level of reliability than an otherwise identical processing unit without EEC memory), whether a trusted platform module (TPM) is present, and/or the like, and/or also whether security gaps of the hardware are known. It may further be taken into account whether the hardware meets particular standards relevant to the safety requirement, for example, whether the requirements of a safety requirement level ("Safety Integrity Level," SIL; SIL 1 through SIL 4) corresponding to IEC 62508 (functional safety of safety-related electrical/electronic/programmable electronic systems) are adhered to. The place of installation or the surroundings of the processing unit may also be taken into account, for example, whether security measures exist, which prevent a manipulation (for example, by a physical access of an attacker), and/or the temperature at the place of installation, and/or local effects (for example, effects of weather such as rain). Empirical values may also be taken into account, i.e., it may be taken into account whether previously determined results of computing instances, which are or have been carried out in the processing unit, were correct or false, for example, by comparison with results of computing instances that are or have been executed in the processing unit, or by comparison with results known per se to be correct (for example, in test call-ups in which the correct result is known). The level of reliability of the processing units may be determined, in particular, taking the aforementioned aspects into account, and may be stored in a list or table, which is read out in step 120. The levels of reliability stored in the list/table may be adapted if further and/or changed data relating to reliability are present, in particular, relating to the aforementioned aspects.

In step 130, the execution of the computing instances in the processing units is started, the successfully validated computing instances in the processing units being started, which have a level of reliability that corresponds to the minimum level of reliability. In this case, multiple computing instances may be started simultaneously, and/or it may be provided that computing instances are started at different points in time. This step may take place, for example, via a management component 22 of provisioning processing unit 10.

In step 140, a function request from a user is received. In addition to call-up parameters, the function request may include further parameters or conditions. Such further parameters or conditions may be, in particular: a minimum number of different computing instances to be utilized and/or a minimum number of different processing units to be utilized and/or a call-up level of reliability and/or a maximum admissible return time. Call-up parameters represent data that are required by the function or by the algorithms that implement the function, in order to be able to determine or calculate a result (function result). The function or the algorithm is basically applied to the call-up parameters in order to determine the result. Step 130 (starting the execution of computing instances) may also take place at least partially, i.e. at least for some computing instances, only after the reception of the function request, for example, when it is recognized that further computing instances are required in order to be able to meet the function request.

In step 150, a call-up of the function takes place in at least a portion of the executed computing instances, which determine corresponding results. The call-up parameters in this case are transferred to the respective computing instances or to the algorithms that implement the function. The function may be called up in all or in only some (for example, a portion) of the computing instances; this may, in particular, also be a function of the minimum number of different computing instances to be utilized and/or the minimum number of different processing units to be utilized, in the event these are indicated in the function request. If the function is implemented in a computing instance 8 with the aid of multiple different algorithms or also in hardware, corresponding interfaces or ports P1, P2, . . . Pk may be provided, via which the results of the different algorithms may be retrieved or returned.

If a call-up level of reliability is contained in the function call-up, the function is called up only in computing instances, which are executed in the processing units, whose level of reliability corresponds to at least the call-up level of reliability. If a maximum admissible return time is included in the function call-up, the function is called up only in computing instances that have a result determination time, which makes it possible to likely maintain the maximum admissible return time. The result determination time of a computing instance represents the time that elapses between the call-up of the function in this computing instance and the return of the result by the computing instance (or the time required by the computing instance for determining the result). The result determination time may, for example, be determined based on known determination times of earlier call-ups, i.e., based on empirical values. If these requests or conditions are not able to be met by the previously started computing instances or the processing units in which they are executed, it may be provided that the execution of further computing instances is started (step 130), the additional computing instances or processing units being selected in such a way that the requests are able to be met.

In step 160, a response, which is sent or returned in step 170 to the user, is determined from the results that have been determined by the computing instances. In order to determine the response based on the results, the results may, in particular, be compared with one another, results being viewed as identical if these match within predefined tolerances. The response used may then be the result which, in the comparison, meets a predefined condition. Possible conditions are, for example, that the result is used, which has been determined most frequently (in terms of the comparison) by the computing instances, or that the result is used, which has occurred at least as often as a predefined minimum number of results. It may, in particular, also be provided that the results are weighted differently. The weighting may, for example, take place based on the computing instance and/or on the processing unit, with the aid of which the result has been determined. If it is not possible to select a result from the response so that the predefined condition is met, it may be provided that an error message is sent as a response to the user. With reference to FIG. 2, a comparison component or adjust component 28 is provided, for example, in provisioning processing unit 10.

Function requests from multiple users may be received at generally different points in time (step 140). Steps 150, 160 and 170 are then carried out for each of these function requests. If it is established that not enough or suitable computing instances are executed, further computing instances may be started (within the scope of the computing resources available in the processing units), i.e. step 130 is carried out again.

In step 210, it is preferably provided to carry out at least one test call-up of the function in one or in multiple computing instances while these are executed, in order to determine a test result or multiple test results by the respective computing instances when the computing instance implements the function with the aid of multiple algorithms. This step may be considered to be a run time validation of computing instances 8, a corresponding run time validation component 24 being provided in provisioning processing unit 10. In a test call-up, the function with the test function parameters is called up, for which the correct result, referred to as the reference result, is known. In addition or alternatively, it may also be provided that a function differing from the test function, which is provided in the computing instance or instances, is called up and the results thereof are used as test results. With the aid of test functions, it is possible, in particular, to recognize hardware errors. Test call-ups and steps 220, 230, 240 based thereon may be carried out continuously, for example, in certain time intervals or at certain points in time, as long as the computing instance is being executed.

In step 220, the test result for each computing instance is then compared with the reference result in order to establish whether the test result (within predefined tolerances) is identical or corresponds to the reference result. Measures or adaptations may be carried out as a function of the comparison or, in general, of a plurality of such comparisons, which are required in order to assign any errors to a computing instance or processing unit.

For this purpose, an error management component 26 may be provided in provisioning processing unit 10. In general, "faulty" is to be understood in terms of a probability that the computing instance or the processing unit does not function correctly.

In preferred step 230, in particular, the level of reliability of a processing unit may be adapted. In this case, the level of reliability may be both increased and decreased. For example, the level of reliability is increased when it is established in the comparison in step 220 that computing instances that are executed by the processing unit always or at least usually determine a test result, which is identical to the reference result. Conversely, the level of reliability may be reduced if it is established in the comparison in step 220 that computing instances that are executed by the processing unit often (for example, at least a predefined percentage) determine a test result, which is not identical to the reference result.

In preferred step 240, a faulty computing instance is terminated or the confidence value of results determined by a faulty computing instance is reduced.

In addition to a determination of faulty computing instances or processing units with the aid of test call-ups (step 210), it is also possible that in step 160, i.e., in the determination of the response from the results, faulty computing instances and/or processing units are deduced, and steps 230 or 240 are carried out on the basis thereof (arrow 165). It may be provided, for example, that a computing instance or a processing unit, in which the former is executed, is recognized as faulty if it always or very frequently determines results that differ from the eventual responses. For this purpose, it may be possible, for example, to compile statistics relating to a plurality of function requests.

What is claimed is:

1. A method for providing a function via a network of processing units using multiple computing instances, each computing instance implementing the function using at least one algorithm and being configured, when it is executed, to determine at least one result in response to a call-up of the function, the method comprising the following steps:
    validating the computing instances, including for each computing instance of the computing instances, checking whether the computing instance corresponds to a respective predetermined state;
    determining a respective level of reliability for each of the processing units;
    starting execution of successfully validated computing instances in the processing units, which have a respective level of reliability that is equal to or greater than a predetermined minimum level of reliability;
    receiving a function request from a user;
    calling up the function in at least a portion of the executed computing instances corresponding to the function request, to determine multiple results;
    determining a response based on the multiple results; and
    sending the response to the user, wherein each of the results is assigned a confidence value, and the confidence values are taken into account in the determination of the response, wherein in the determination of the response: (i) only those results are taken into account which have at least a minimum confidence value, and/or (ii) the results are weighted according to the confidence values.

2. The method as recited in claim 1, wherein the multiple results are compared with one another in order to determine the response, one of the results being used as the response, which most frequently matches other results within predefined tolerances, the response preferably matching at least a predefined minimum number of the results within predefined tolerances.

3. The method as recited in claim 2, wherein a response confidence is determined based on a frequency with which the response occurs in the results taking the tolerances into account and is sent to the user.

4. The method as recited claim 1, wherein identical multiple computing instances in different processing units are started, and/or the function is called up in multiple, identical computing instances.

5. The method as recited in claim 1, wherein during determination of the response, only those results are taken into account which fall within a predetermined maximum response time predefined by the function request.

6. A method for providing a function via a network of processing units using multiple computing instances, each computing instance implementing the function using at least one algorithm and being configured, when it is executed, to determine at least one result in response to a call-up of the function, the method comprising the following steps:
    validating the computing instances, including for each computing instance of the computing instances, checking whether the computing instance corresponds to a respective predetermined state;
    determining a respective level of reliability for each of the processing units;
    starting execution of successfully validated computing instances in the processing units, which have a respective level of reliability that is equal to or greater than a predetermined minimum level of reliability;
    receiving a function request from a user;
    calling up the function in at least a portion of the executed computing instances corresponding to the function request, to determine multiple results;
    determining a response based on the multiple results; and
    sending the response to the user, wherein each of the results is assigned a confidence value, and the confidence values are taken into account in the determination of the response, wherein an overall confidence value is determined based on the confidence values of the results, and the overall confidence value is sent to the user with the response.

7. A method for providing a function via a network of processing units using multiple computing instances, each computing instance implementing the function using at least one algorithm and being configured, when it is executed, to determine at least one result in response to a call-up of the function, the method comprising the following steps:
    validating the computing instances, including for each computing instance of the computing instances, checking whether the computing instance corresponds to a respective predetermined state;
determining a respective level of reliability for each of the processing units;
starting execution of successfully validated computing instances in the processing units, which have a respective level of reliability that is equal to or greater than a predetermined minimum level of reliability;
receiving a function request from a user;
calling up the function in at least a portion of the executed computing instances corresponding to the function request, to determine multiple results;
determining a response based on the multiple results; and
sending the response to the user, wherein an actual level of reliability or an average level of reliability of the processing units, in which the computing instances are executed, in which the function has been called up, is sent to the user.

8. A method for providing a function via a network of processing units using multiple computing instances, each computing instance implementing the function using at least one algorithm and being configured, when it is executed, to determine at least one result in response to a call-up of the function, the method comprising the following steps:
validating the computing instances, including for each computing instance of the computing instances, checking whether the computing instance corresponds to a respective predetermined state;
determining a respective level of reliability for each of the processing units;
starting execution of successfully validated computing instances in the processing units, which have a respective level of reliability that is equal to or greater than a predetermined minimum level of reliability;
receiving a function request from a user;
calling up the function in at least a portion of the executed computing instances corresponding to the function request, to determine multiple results;
determining a response based on the multiple results;
sending the response to the user;
carrying out test call-ups of the function and/or a test callup for which a reference result is known, to determine test results; and
comparing the test results with the reference results in order, based on the test results that do not match the reference results, to recognize faulty processing units and/or computing instances.

9. The method as recited in claim 8, wherein: (i) the level of reliability of a processing unit that has been recognized as faulty is reduced below the minimum level of reliability, and/or (ii) results of a computing instance that has been recognized as faulty are assigned a reduced confidence value, and/or (iii) execution of computing instances that have been recognized as faulty or that are executed in processing units recognized as faulty are stopped.

10. A method for providing a function via a network of processing units using multiple computing instances, each computing instance implementing the function using at least one algorithm and being configured, when it is executed, to determine at least one result in response to a call-up of the function, the method comprising the following steps:
validating the computing instances, including for each computing instance of the computing instances, checking whether the computing instance corresponds to a respective predetermined state;
determining a respective level of reliability for each of the processing units;
starting execution of successfully validated computing instances in the processing units, which have a respective level of reliability that is equal to or greater than a predetermined minimum level of reliability;
receiving a function request from a user;
calling up the function in at least a portion of the executed computing instances corresponding to the function request, to determine multiple results;
determining a response based on the multiple results; and
sending the response to the user, wherein in a single one of the computing instances, multiple different algorithms are provided which implement the function in order to determine multiple computing instance results.

11. The method as recited in claim 10, wherein an overall result of the computing instance is determined based on the multiple computing instance results and the response is determined based on the overall result of the computing instance.

12. A provisioning processing unit, configured to provide a function via a network of processing units using multiple computing instances, each computing instance implementing the function using at least one algorithm and being configured, when it is executed, to determine at least one result in response to a call-up of the function, the provisioning processing unit configured to:
validate the computing instances, including for each computing instance of the computing instances, checking whether the computing instance corresponds to a respective predetermined state;
determine a respective level of reliability for each of the processing units;
start execution of successfully validated computing instances in the processing units, which have a respective level of reliability that is equal to or greater than a predetermined minimum level of reliability;
receive a function request from a user;
call up the function in at least a portion of the executed computing instances corresponding to the function request, to determine multiple results;
determine a response based on the multiple results; and
send the response to the user, wherein each of the results is assigned a confidence value, and the confidence values are taken into account in the determination of the response, wherein in the determination of the response: (i) only those results are taken into account which have at least a minimum confidence value, and/or (ii) the results are weighted according to the confidence values.

13. A non-transitory machine-readable memory medium on which is stored a provisioning computer program for providing a function via a network of processing units using multiple computing instances, each computing instance implementing the function using at least one algorithm and being configured, when it is executed, to determine at least one result in response to a call-up of the function, the provisioning computer program, when executed by a processing unit, causing the processing unit to perform the following steps:
validating the computing instances, including for each computing instance of the computing instances, checking whether the computing instance corresponds to a respective predetermined state;
determining a respective level of reliability for each of the processing units;
starting execution of successfully validated computing instances in the processing units, which have a respective level of reliability that is equal to or greater than a predetermined minimum level of reliability;

receiving a function request from a user;

calling up the function in at least a portion of the executed computing instances corresponding to the function request, to determine multiple results;

determining a response based on the multiple results; and sending the response to the user, wherein each of the results is assigned a confidence value, and the confidence values are taken into account in the determination of the response, wherein in the determination of the response: (i) only those results are taken into account which have at least a minimum confidence value, and/or (ii) the results are weighted according to the confidence values.

* * * * *